United States Patent
Mori et al.

(10) Patent No.: US 7,215,366 B2
(45) Date of Patent: May 8, 2007

(54) TONE CORRECTING CIRCUIT AND HUE CORRECTING CIRCUIT

(75) Inventors: Yukio Mori, Hirakata (JP); Seiji Okada, Hirakata (JP); Tetsuo Mise, Hirakata (JP); Masahiko Yoshiyama, Daito (JP); Haruhiko Murata, Ibaraki (JP); Toshiya Iinuma, Kadoma (JP); Syugo Yamashita, Hirakata (JP)

(73) Assignee: Sanyo Electric Co., Ltd., Osaka (JP)

( * ) Notice: Subject to any disclaimer, the term of this patent is extended or adjusted under 35 U.S.C. 154(b) by 743 days.

(21) Appl. No.: 10/363,387

(22) PCT Filed: Sep. 14, 2001

(86) PCT No.: PCT/JP01/08021

§ 371 (c)(1),
(2), (4) Date: Mar. 3, 2003

(87) PCT Pub. No.: WO02/23917

PCT Pub. Date: Mar. 21, 2002

(65) Prior Publication Data

US 2003/0193579 A1    Oct. 16, 2003

(30) Foreign Application Priority Data

Sep. 18, 2000 (JP) .............................. 2000-282363
Sep. 26, 2000 (JP) .............................. 2000-292734
Mar. 22, 2001 (JP) .............................. 2001-83406

(51) Int. Cl.
*H04N 9/73* (2006.01)
*H04N 9/64* (2006.01)

(52) U.S. Cl. .................................. 348/223.1; 348/649
(58) Field of Classification Search ............ 348/223.1, 348/649–652, 222.1, 256; 382/167
See application file for complete search history.

(56) References Cited

U.S. PATENT DOCUMENTS 5,381,185 A    1/1995    Ohki et al.
5,412,433 A *  5/1995    Holland et al. .............. 348/650
5,764,308 A *  6/1998    Lee .............................. 348/649

(Continued)

FOREIGN PATENT DOCUMENTS

EP    0 942 608 A2    9/1999

(Continued)

OTHER PUBLICATIONS

International Search Report for PCT/JP01/08021 mailed on Dec. 4, 2001.

(Continued)

*Primary Examiner*—Ngoc-Yen Vu
*Assistant Examiner*—Gregory V. Madden
(74) *Attorney, Agent, or Firm*—McDermott Will & Emery LLP

(57) ABSTRACT

There are provided hue detecting means for detecting a hue component for each pixel from a first color difference signal R–Y and a second color difference signal B–Y, and gain controlling means for controlling for each pixel a gain for arbitrarily selected one of or an arbitrary combination of a luminance signal, a first color difference signal R–Y, and a second color difference signal B–Y depending on the detected hue component for each pixel.

4 Claims, 11 Drawing Sheets

U.S. PATENT DOCUMENTS

| | | | |
|---|---|---|---|
| 5,999,230 A * | 12/1999 | Tanabe | 348/649 |
| 6,111,607 A | 8/2000 | Kameyama | |
| 6,958,784 B2 * | 10/2005 | Itani et al. | 348/630 |
| 6,963,362 B1 * | 11/2005 | Nakayama | 348/224.1 |

FOREIGN PATENT DOCUMENTS

| | | |
|---|---|---|
| JP | 61-26384 | 2/1986 |
| JP | 61-026384 A1 | 2/1986 |
| JP | 3-135292 | 6/1991 |
| JP | 9-200792 | 7/1997 |
| JP | 09-200792 A1 | 7/1997 |
| JP | 09-331539 A1 | 12/1997 |
| JP | 10-023451 A1 | 1/1998 |
| JP | 10-079954 A1 | 3/1998 |
| JP | 10-285607 | 10/1998 |
| JP | 11-136693 | 5/1999 |
| JP | 2000-22977 | 1/2000 |
| JP | 2000-23185 | 1/2000 |
| JP | 2000-023185 A1 | 1/2000 |
| JP | 2000-078605 A1 | 3/2000 |
| JP | 2000-101859 A1 | 4/2000 |

OTHER PUBLICATIONS

English translation of International Preliminary Examination Report mailed on Mar. 7, 2003.

Supplementary European Search Report Issued in corresponding European Patent Application No. EP 01 96 7686, dated Oct. 12, 2006.

Japanese Office Action issued in corresponding Japanese Patent Application No. JP 2000-282363, dated Jun. 24, 2003.

Japanese Office Action issued in corresponding Japanese Patent Application No. JP 2001-083406, dated Feb. 24, 2004.

Japanese Office Action issued in corresponding Japanese Patent Application No. JP 2000-282363, dated Sep. 21, 2004.

* cited by examiner

TONE CORRECTING CIRCUIT AND HUE CORRECTING CIRCUIT

TECHNICAL FIELD

The present invention relates to a tone correcting circuit, a hue correcting circuit, and a color correcting circuit.

BACKGROUND ART

FIG. 1 illustrates the configuration of a conventional signal processing circuit in a single plate-type CCD color camera.

A first 1H delay circuit 1 generates a video signal obtained by delaying an input video signal (a CCD output signal) by 1H (one horizontal period). A second 1H delay circuit 2 generates a video signal obtained by further delaying by 1H the video signal delayed by 1H.

The input video signal, the video signal delayed by 1H, and the signal delayed by 2H are fed to a YC separating circuit 3. A luminance signal Yh, a vertical contour signal Vap, a G signal, an R signal, and a B signal are outputted from the YC separating circuit 3.

The luminance signal Yh and the vertical contour signal Vap are fed to a Y process circuit 4, are subjected to predetermined luminance signal processing, and are then outputted as a luminance signal Yout.

The G signal, the R signal, and the B signal are fed to a color difference matrix circuit 5. The color difference matrix circuit 5 comprises four adders 11, 12, 13, and 14, four multipliers 21, 22, 23, and 24, and a color difference matrix coefficient register 25 for giving a multiplication coefficient to each of the multipliers 21, 22, 23, and 24. The multiplication coefficient given to each of the multipliers 21, 22, 23, and 24 is set in the color difference matrix coefficient register 25 by a CPU 7.

Letting $K_{RRY}$, $K_{RBY}$, $K_{BRY}$, and $K_{BBY}$ be respectively the multiplication coefficients given to the multipliers 21, 22, 23, and 24, the color difference matrix circuit 5 performs an operation expressed by the following equation (1), to generate color difference signals (R−Y) and (B−Y).

$$R-Y = K_{RRY}(R-G) + K_{BRY}(B-G)$$
$$B-Y = K_{RBY}(R-G) + K_{BBY}(B-G) \quad (1)$$

The color difference signals (R−Y) and (B−Y) obtained by the color difference matrix circuit 5 are fed to a color encoding circuit 6.

In the color encoding circuit 6, two color carriers between which there is a phase difference of 90 degrees are respectively modulated by the color difference signals (R−Y) and (B−Y), and are synthesized, to generate a chrominance signal Cout.

In the above-mentioned circuit, the tone of a video output can be adjusted by changing the coefficients $K_{RRY}$, $K_{RBY}$, $K_{BRY}$, and $K_{BBY}$ in the color difference matrix circuit 5. That is, a gain in an R−Y direction, a hue (HUE) corresponding to a B−Y axis, a hue (HUE) corresponding to an R−Y axis, and a gain in a B−Y direction are respectively adjusted by the coefficients $K_{RRY}$, $K_{BRY}$, $K_{RBY}$, and $K_{BBY}$, as shown in FIGS. 2a, 2b, 2c, and 2d.

Meanwhile, in the case of the single plate type CCD color camera, a color filter is arranged on a front surface of a CCD. Particularly when a complementary color filter is used as the color filter, it is difficult to change the spectral-response characteristics of Ye, Mg, Cy, and G color filters to ideal characteristics. Accordingly, a color different from the inherent color is reproduced.

For example, green-based colors are not easily obtained, blue-based colors are predominantly obtained, and red-based colors are shifted in a magenta direction. It is difficult to adjust such degradation of color reproducibility only by the coefficients $K_{RRY}$, $K_{RBY}$, $K_{BRY}$, and $K_{BBY}$ in the color difference matrix circuit 5. The reason for this is that in a case where green-based colors are insufficient, for example, when the coefficient $K_{RRY}$ is increased, green can be heightened, while cyan, red, and magenta are also similarly heightened.

An object of the present invention is to provide a tone correcting circuit capable of correcting a tone only for an arbitrary hue.

Another object of the present invention is to provide a hue correcting circuit capable of correcting a hue only for an arbitrary hue.

Still another object of the present invention is to provide a color correcting circuit capable of correcting a color only for a hue within an arbitrary range out of all hue ranges.

DISCLOSURE OF INVENTION

A tone correcting circuit according to the present invention is characterized by comprising hue detecting means for detecting a hue component for each pixel from a first color difference signal R−Y and a second color difference signal B−Y; and gain controlling means for controlling for each pixel a gain for arbitrarily selected one of or an arbitrary combination of a luminance signal, a first color difference signal R−Y, and a second color difference signal B−Y depending on the detected hue component for each pixel, thereby correcting a tone only for an arbitrary hue.

A gain is set for each hue. An example of the gain controlling means is one comprising gain calculating means for calculating for each pixel the gain corresponding to the hue component for each pixel detected by the hue detecting means on the basis of the set gain for each hue, and means for providing for each pixel the gain for the pixel calculated by the gain calculating means as the gain for arbitrarily selected one of or the arbitrary combination of the luminance signal, the first color difference signal R−Y, and the second color difference signal B−Y.

An example of the hue detecting means is one comprising a first bit shift circuit to which the first color difference signal (R−Y) is inputted, a second bit shift circuit to which a second color difference signal (B−Y) is inputted, and means for outputting for each pixel hue values corresponding to output values of both the bit shift circuits as hue components on the basis of a look-up table, each of the bit shift circuits cutting the number of bits composing an n-bit input signal to m which is smaller than n, cutting, when at least the respective uppermost bits in the color difference signals are both zero, the upper x bits in each of the color difference signals, letting x be the smaller one of the number of bits, out of the bits from the uppermost bit to the (m+1)-th bit in one of the color difference signals, which are continuously zero from the uppermost bit and the number of bits, out of the bits from the uppermost bit to the (m+1)-th bit in the other color difference signal, which are continuously zero from the uppermost bit, and further cutting the lower (n−m−x) bits in each of the color difference signals when x is smaller than (n−m).

A hue correcting circuit according to the present invention is characterized by comprising hue detecting means for detecting a hue component for each pixel from a first color difference signal R-Y and a second color difference signal B-Y; first offset providing means for providing an offset for each pixel to the first color difference signal R-Y depending on the detected hue component for each pixel; and second offset providing means for providing an offset for each pixel to the second color difference signal B-Y, thereby correcting a hue only for an arbitrary hue.

An offset is set for each hue. An example of each of the offset providing means is one comprising saturation detecting means for detecting saturation for each pixel from the first color difference signal R-Y and the second color difference signal B-Y, offset calculating means for calculating for each pixel an offset corresponding to the hue component for each pixel detected by the hue detecting means on the basis of the set offset for each hue, offset producing means for multiplying the offset for each pixel calculated by the offset calculating means by the saturation of the corresponding pixel detected by the saturation detecting means, to produce for each pixel the offset corresponding to the saturation, and means for providing for each pixel the offset for each pixel produced by the offset producing means to the color difference signal.

An example of the hue detecting means is one comprising a first bit shift circuit to which the first color difference signal (R-Y) is inputted, a second bit shift circuit to which a second color difference signal (B-Y) is inputted, and means for outputting for each pixel hue values corresponding to output values of both the bit shift circuits as hue components on the basis of a look-up table, each of the bit shift circuits cutting the number of bits composing an n-bit input signal to m which is smaller than n, cutting, when at least the respective uppermost bits in the color difference signals are both zero, the upper x bits in each of the color difference signals, letting x be the smaller one of the number of bits, out of the bits from the uppermost bit to the (m+1)-th bit in one of the color difference signals, which are continuously zero from the uppermost bit and the number of bits, out of the bits from the uppermost bit to the (m+1)-th bit in the other color difference signal, which are continuously zero from the uppermost bit, and further cutting the lower (n−m−x) bits in each of the color difference signals when x is smaller than (n−m).

A first color correcting circuit according to the present invention is characterized in that within a color difference signal plane, the range of a hue is divided into a plurality of regions by at least two division axes passing through the origin, and by comprising judging means for judging, on the basis of input color difference signals R-Y and B-Y, to which of the regions the hue of the input color difference signal belongs, and color difference signal converting means for subjecting the input color difference signal whose hue is judged to belong to the predetermined region to color difference signal conversion processing, the color difference signal converting means comprising coefficient calculating means for calculating, in a case where a position vector of the input color difference signal whose hue is judged to belong to the predetermined region is decomposed into vector components corresponding to the two adjacent division axes, the coefficient of each of the vector components, and means for respectively primarily converting the vectors corresponding to the two division axes by a transform matrix previously set, to convert the input color difference signal on the basis of the vectors corresponding to the two axes after the primary conversion and the coefficients calculated by the coefficient calculation means.

A second color correcting circuit according to the present invention is characterized in that within a color difference signal plane, the range of a hue is divided into a plurality of regions by at least two division axes passing through the origin, and by comprising judging means for judging, on the basis of input color difference signals R-Y and B-Y, to which of the regions the hue of the input color difference signal belongs, and color difference signal converting means for subjecting the input color difference signal whose hue is judged to belong to the predetermined region to color difference signal conversion processing, the color difference signal converting means comprising coefficient calculating means for calculating, in a case where it is assumed that a position vector of the input color difference signal whose hue is judged to belong to the predetermined region is decomposed into vector components corresponding to the two adjacent division axes, the coefficient of each of the vector components, and means for converting the input color difference signal on the basis of vectors corresponding to the two axes after the conversion, which have been previously set for the vector components corresponding to the two division axes and the coefficients calculated by the coefficient calculating means.

The range of the hue is divided into six regions by three division axes comprising a Ye-B axis, a Cy-R axis, and an Mg-G axis within the color difference signal plane. An example of the judging means is one for judging to which of the regions the hue of the input color difference signal belongs on the basis of the input color difference signals R-Y and B-Y.

An example of the judging means is one comprising means for operating the respective inner products of vectors respectively perpendicular to the vectors corresponding to the division axes and the position vector of the input color difference signal, and means for judging to which of the regions the hue of the input color difference signal belongs on the basis of the respective signs of the inner products.

BEST MODE FOR CARRYING OUT THE INVENTION

Description is now made of embodiments in a case where the present invention is applied to a single plate type color camera.

[A] First Embodiment

Referring to FIGS. 3 to 10, a first embodiment of the present invention will be described.

Figure 1:
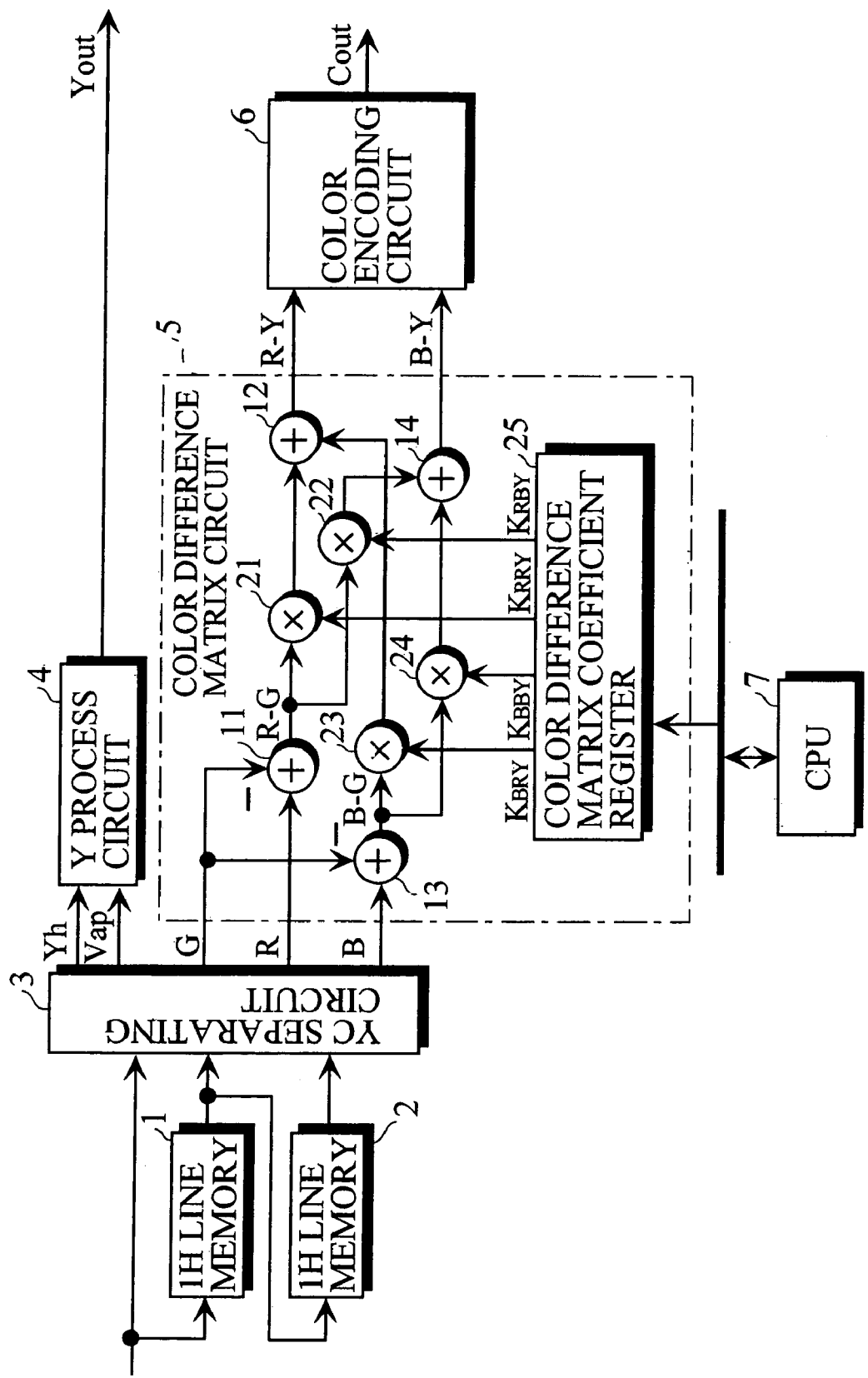
FIG. 1 is a block diagram showing the configuration of a conventional signal processing circuit in a single plate type CCD color camera.
Figure 2A:
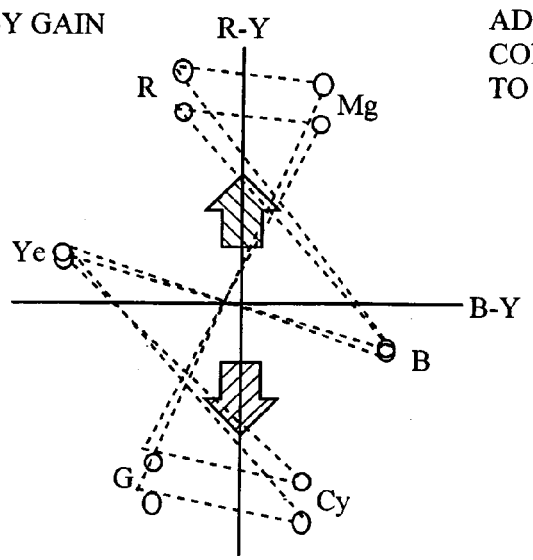
FIGS. 2a to 2d are schematic views for explaining that the tone of a video output can be adjusted by changing coefficients $K_{RRY}$, $K_{RBY}$, $K_{BRY}$, and $K_{BBY}$ in a color difference matrix circuit.
Figure 2B:
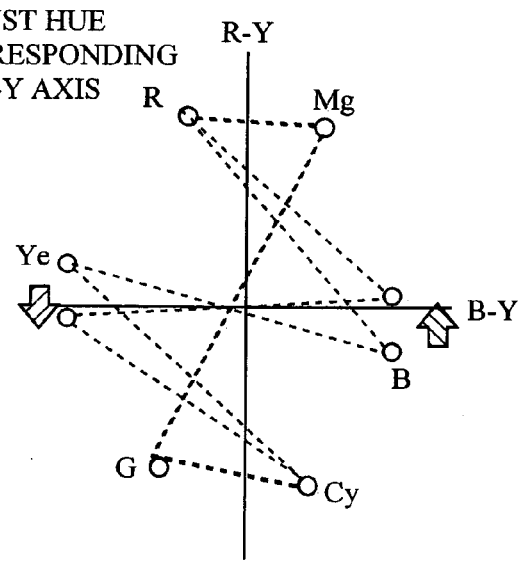
Figure 2C:
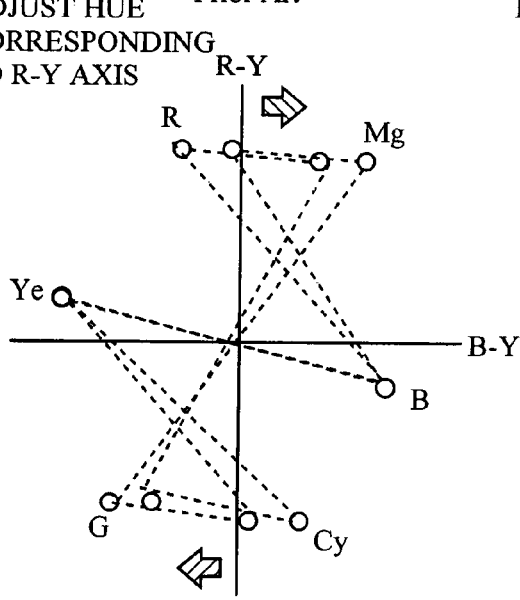
Figure 2D:
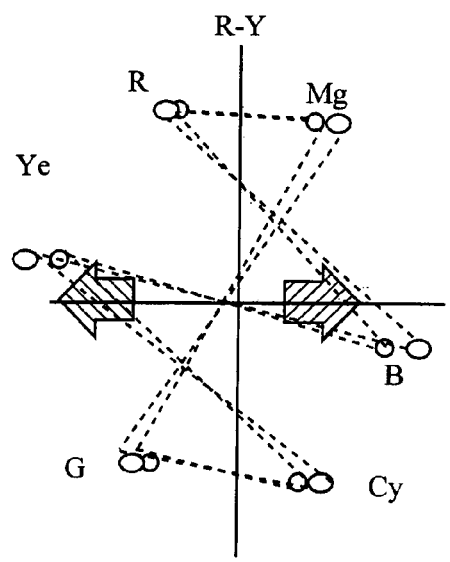
Figure 3:
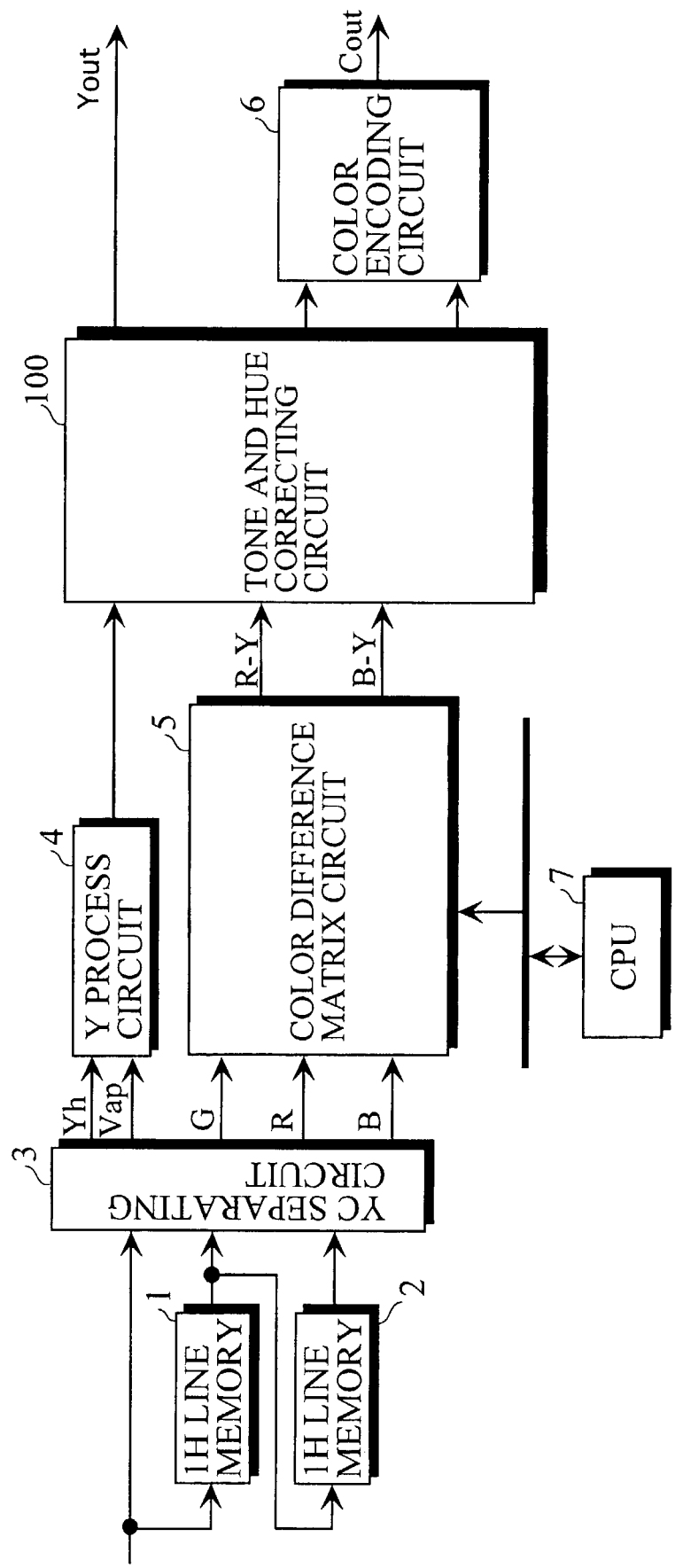
FIG. 3 is a block diagram showing the configuration of a signal processing circuit in a single plate type CCD color camera.

FIG. 3 illustrates the configuration of a signal processing circuit in a single plate type CCD color camera. In FIG. 3, the same components as those shown in FIG. 1 are assigned the same reference numerals and hence, the description thereof is not repeated. In the signal processing circuit, a tone and hue correcting circuit 100 is added to the signal processing circuit shown in FIG. 1.

Figure 4:
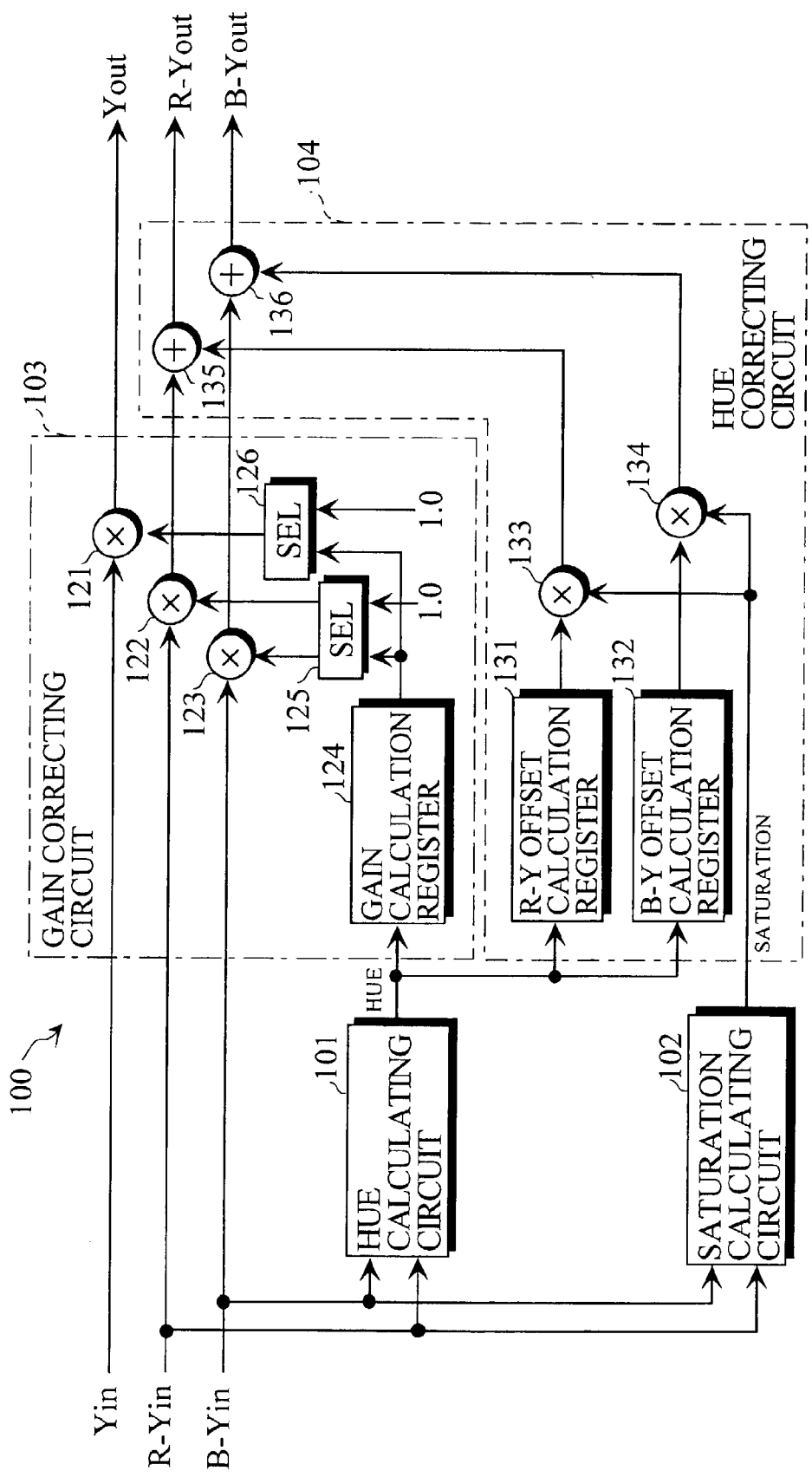
FIG. 4 is a block diagram showing the configuration of a tone and hue correcting circuit.

FIG. 4 illustrates the configuration of the tone and hue correcting circuit 100.

A luminance signal Y outputted from a Y process circuit 4 and color difference signals (R–Y) and (B–Y) outputted from a color difference matrix circuit 5 are inputted to the tone and hue correcting circuit 100.

The tone and hue correcting circuit 100 comprises a hue calculating circuit 101, a saturation calculating circuit 102 for calculating saturation on the basis of the color difference signals (R–Y) and (B–Y), a gain correcting circuit (a tone correcting circuit) 103, and a hue correcting circuit 104.

Figure 5:
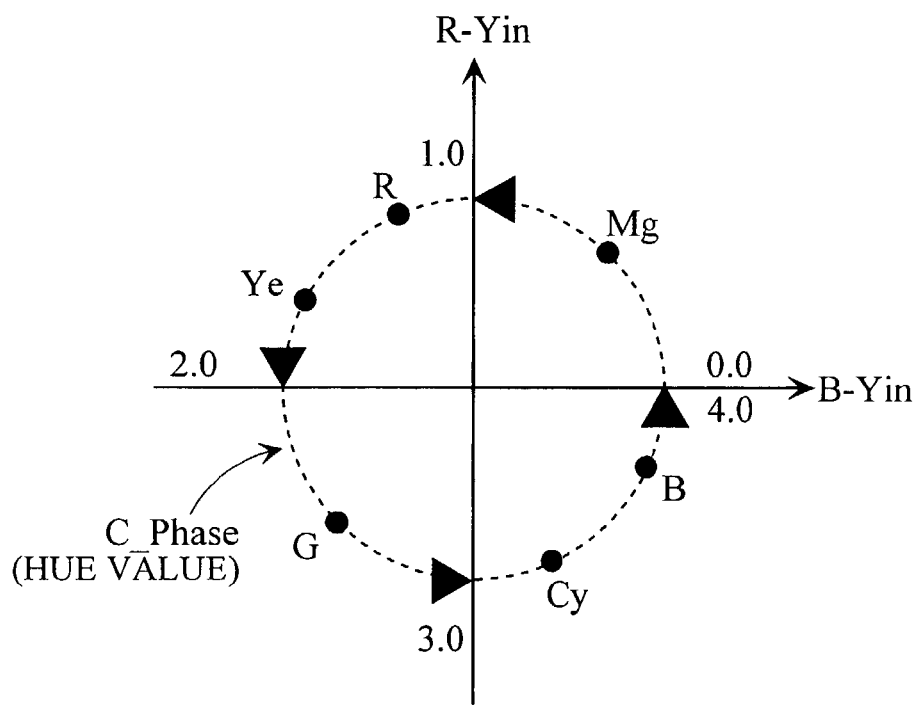
FIG. 5 is a schematic view showing a hue value C_Phase calculated by a hue calculating circuit.

The hue calculating circuit 101 calculates for each pixel a hue value C_Phase, as shown in FIG. 5, on the basis of the color difference signals (R–Y) and (B–Y). The hue value C_Phase is found as values 0.0 to 4.0 corresponding to an angle centered at the origin on a color difference signal plane, as shown in FIG. 5. Consequently, the hue value C_Phase is a value corresponding to the ratio of the color difference signals (R–Y)/(B–Y) (more specifically, $\tan^{-1}\{(R-Y)/(B-Y)\}$).

Figure 6:
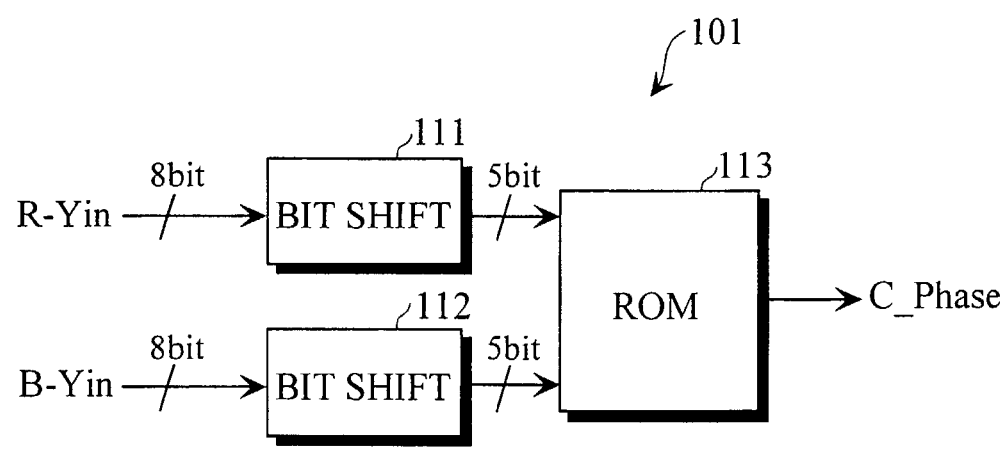
FIG. 6 is a block diagram showing the configuration of a hue calculating circuit.

The hue calculating circuit 101 comprises a first bit shift circuit 111 to which the color difference signal (R–Y) is inputted, a second bit shift circuit 112 to which the color difference signal (B–Y) is inputted, and a ROM 113, as shown in FIG. 6.

The two bit shift circuits 111 and 112 are provided in order to cut the number of bits composing an 8-bit input signal to five. That is, each of the bit shift circuits 111 and 112 performs bit shifting, described below.

(1) When the upper three bits in each of the color difference signals (R–Y) and (B–Y) are zero, the bit shifting is performed such that the upper three bits are cut.

(2) When the upper two bits in each of the color difference signals (R–Y) and (B–Y) are zero, the bit shifting is performed such that the upper two bits are cut, and the lower one bit is rounded down (cut).

(3) When the upper one bit in each of the color difference signals (R–Y) and (B–Y) is zero, the bit shifting is performed such that the upper one bit is cut, and the lower two bits are rounded down (cut).

(4) In a case which does not correspond to the foregoing items (1) to (3), the bit shifting is performed such that the lower three bits in each of the color difference signals (R–Y) and (B–Y) are rounded down (cut).

The 5-bit color difference signal (R–Y) and the 5-bit color difference signal (B–Y) which are inputted are inputted to the ROM 113. The ROM 113 outputs for each pixel a hue value C_Phase corresponding to the values of the input color difference signals (R–Y) and (B–Y) on the basis of a hue conversion table previously stored.

The saturation calculating circuit 102 calculates for each pixel saturation on the basis of the color difference signals (R–Y) and (B–Y). The saturation calculating circuit 102 calculates for each pixel saturation corresponding to the magnitude of each of the input color difference signals (R–Y) and (B–Y) on the basis of a saturation conversion table previously stored.

The gain correcting circuit 103 comprises a multiplier 121 for adjusting the gain of the luminance signal Y, a multiplier 122 for adjusting the gain of the color difference signal (R–Y), a multiplier 123 for adjusting the gain of the color difference signal (B–Y), a gain calculation register 124, and two selecting circuits (SEL) 125 and 126.

In the gain calculation register 124, a gain for each hue value is set by a user in order to adjust the saturation of a particular hue and adjust the lightness of the particular hue. That is, the gain is set at intervals of 0.25 for the hue values 0.0 to 4.0 in the gain calculation register 124.

Figure 7:
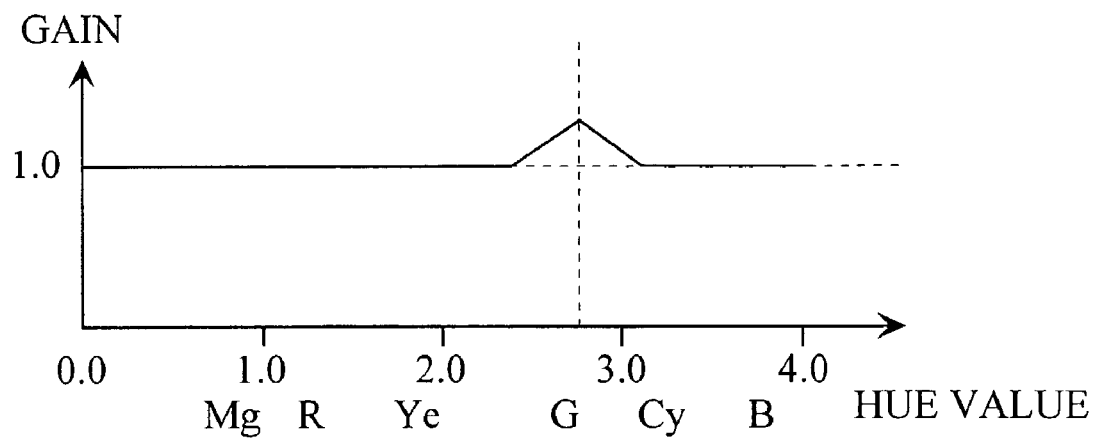
FIG. 7 is a graph showing a gain for each hue value set in a gain calculation register in a case where it is desired to emphasize only green.

In cases such as a case where it is desired to only emphasize green (a case where it is desired to increase the concentration of green) and a case where it is desired to brighten only green, such gains for each hue value that the gain against only the hue of green (the vicinity of the hue value 2.75) is increased are set in the gain calculation register 124, as shown in FIG. 7.

The gain calculation register 124 calculates for each pixel a gain corresponding to the hue value C_Phase sent from the hue calculating circuit 101, and outputs the calculated gain. Gains are set at intervals of 0.25 for the hue values 0.0 to 4.0 in the gain calculation register 124. When the hue value C_Phase sent from the hue calculating circuit 101 is a value between the two hue values for which the gains are respectively set, therefore, the gain calculation register 124 linearly interpolates the gains for the two hue values, thereby calculating the gain for the inputted hue value C_Phase and outputting the calculated gain.

The gain calculated for each pixel by the gain calculation register 124 is sent to the first selecting circuit 125 and the second selecting circuit 126. The first selecting circuit 125 selects the gain or "1" calculated by the gain calculation register 124, and sends the selected gain or "1" to the multipliers 122 and 123. The second selecting circuit 126 selects the gain or "1" calculated by the gain calculation register 124, and sends the selected gain or "1" to the multiplier 121.

When the concentration of the particular hue is adjusted, the first selecting circuit 125 is controlled such that the gain calculated by the gain calculation register 124 is selected. When the brightness of the particular hue is adjusted, the second selecting circuit 126 is controlled such that the gain calculated by the gain calculation register 124 is selected.

Figure 8:
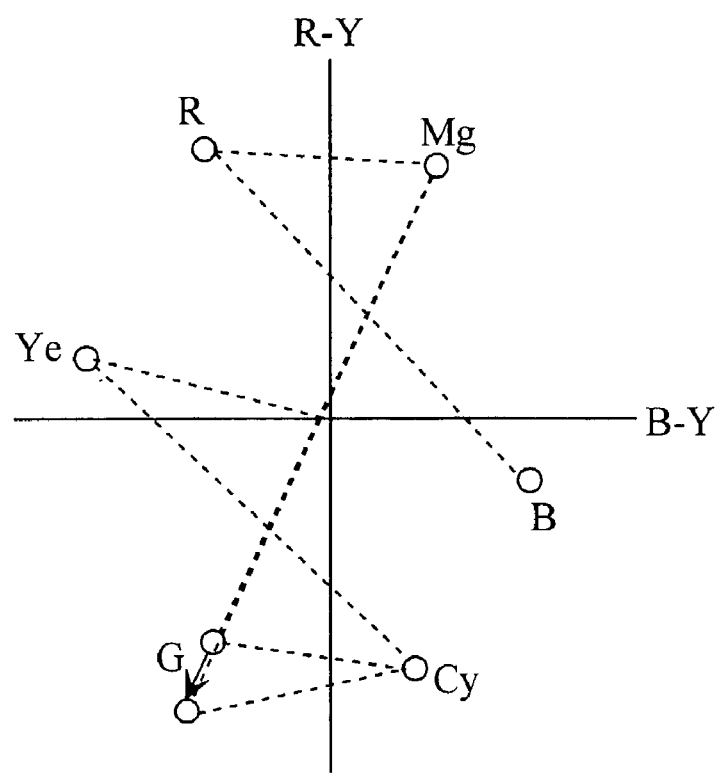
FIG. 8 is a schematic view showing that the saturation of green is increased in a case where a gain for each hue value as shown in FIG. 7 is set in a gain calculation register.

In a case where such gains that the gain against only the hue of green is increased are set, as shown in FIG. 7, in the gain calculation register 124, for example, suppose a case where the gain calculated by the gain calculation register 124 through the first selecting circuit 125 is sent to the multipliers 122 and 123. In this case, the gains of the color difference signals (R−Y) and (B−Y) against the hue of green are raised. Accordingly, the saturation of green is increased, as shown in FIG. 8.

Furthermore, when the gain calculated by the gain calculation register 124 through the second selecting circuit 126 is sent to the multiplier 121, the gain of the luminance signal Y against the hue of green is raised. Accordingly, the lightness of green is increased.

The hue correcting circuit 104 comprises an R−Y offset calculation register 131, a B−Y offset calculation register 132, a multiplier 133 for multiplying saturation calculated by the saturation calculating circuit 102 by an offset outputted from the R−Y offset calculation register 131, a multiplier 134 for multiplying the saturation calculated by the saturation calculating circuit 102 by an offset outputted from the B−Y offset calculation register 132, an adder 135 for adding an offset outputted from the multiplier 133 to the color difference signal (R−Y) outputted from the gain correcting circuit 103, and an adder 136 for adding an offset outputted from the multiplier 134 to the color difference signal (B−Y) outputted from the gain correcting circuit 103.

The offset for each hue value is set by the user, in order to correct the hue for only the particular hue, in each of the R−Y offset calculation register 131 and the B−Y offset calculation register 132. That is, the offset is set at intervals of 0.25 against the hue values 0.0 to 4.0 in each of the offset calculation registers 131 and 132.

Figure 9:
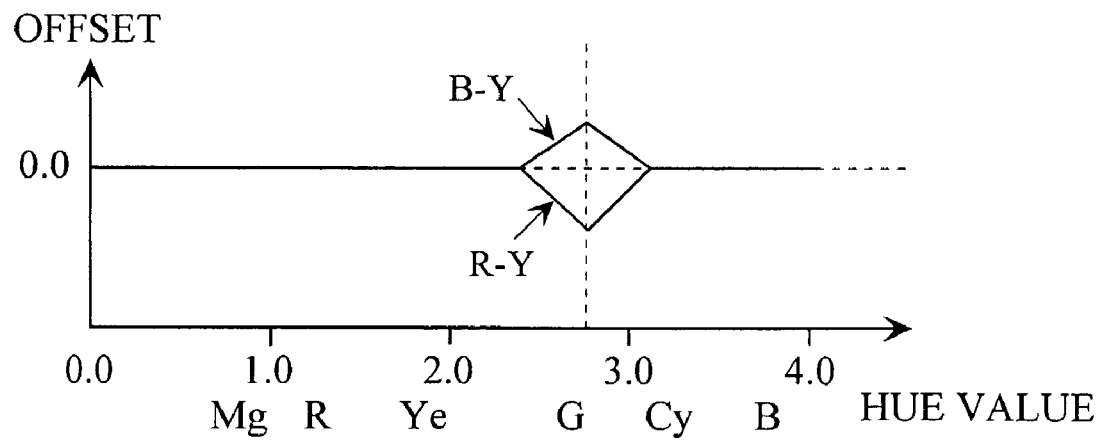
FIG. 9 is a graph showing an offset for each hue value set in each offset calculation register in a case where it is desired to correct the hue of green toward Ye.

In a case where it is desired to correct the hue of green toward Ye, for example, the offset for each hue value, as shown in FIG. 9, is set in each of the offset calculation registers 131 and 132. In FIG. 9, R−Y indicates the offset for each hue value set in the R−Y offset calculation register 131, and B−Y indicates the offset for each hue value set in the B−Y offset calculation register 132.

Each of the offset calculation registers 131 and 132 calculates for each pixel an offset corresponding to the hue value C_Phase sent from the hue calculating circuit 101, and outputs the calculated offset. Offsets are set at intervals of 0.25 for the hue values 0.0 to 4.0 in each of the offset calculation registers 131 and 132. When the hue value C_Phase sent from the hue calculating circuit 101 is a value between the two hue values for which the offsets are respectively set, therefore, each of the offset calculation registers 131 and 132 linearly interpolates the offsets for the two hue values, thereby calculating the offset for the inputted hue value C_Phase and outputting the calculated offset.

The offset calculated for each pixel by the R−Y offset calculation register 131 is sent to the multiplier 133, and is multiplied by the saturation calculated by the saturation calculating circuit 102. Consequently, the R−Y offset corresponding to the saturation is obtained for each pixel. Similarly, the offset for each pixel calculated by the R−Y offset calculation register 132 is sent to the multiplier 134, and is multiplied by the saturation calculated by the saturation calculating circuit 102. Consequently, the B−Y offset corresponding to the saturation is obtained for each pixel.

The R−Y offset outputted from the multiplier 133 is sent to the adder 135, and is added to the color difference signal (R−Y) outputted from the gain correcting circuit 103. Similarly, the B−Y offset outputted from the multiplier 134 is sent to the adder 136, and is added to the color difference signal (B−Y) outputted from the gain correction circuit 103.

Figure 10:
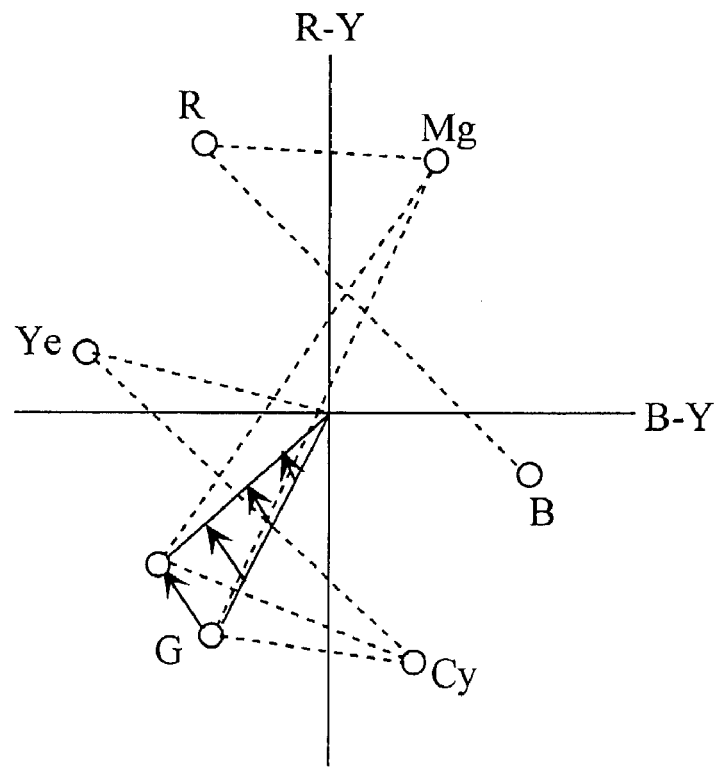
FIG. 10 is a schematic view showing that the hue of green is corrected toward Ye in a case where an offset for each hue value as shown in FIG. 9 is set in an offset calculation register.

When an offset for correcting the hue of green toward Ye is set, as shown in FIG. 9, in each of the offset calculation registers 131 and 132, for example, the offset is provided to the color difference signal (R−Y) corresponding to the hue of green such that the magnitude thereof is decreased, and the offset is provided to the color difference signal (B−Y) corresponding to the hue of green such that the magnitude thereof is increased. Consequently, the hue of green is moved toward Ye, as shown in FIG. 10.

Although in the above-mentioned first embodiment, description was made of a case where the saturation, lightness, and hue are adjusted for the hue of green, it goes without saying that the saturation, lightness, and hue can be also similarly adjusted for another arbitrary hue.

Although in the above-mentioned first embodiment, description was made of a case where the present invention is applied to the single plate type color camera, the present invention is also applicable to video display devices such as a television receiver, a VTR, and a liquid crystal projector.

According to the above-mentioned first embodiment, the tone can be corrected only for the arbitrary hue. Further, according to the above-mentioned first embodiment, the hue can be corrected only for the arbitrary hue.

[B] Description of Second Embodiment

Referring to FIGS. 11 to 15, a second embodiment of the present invention will be described.

[1] Description of Configuration of Color Correcting Circuit

Figure 11:
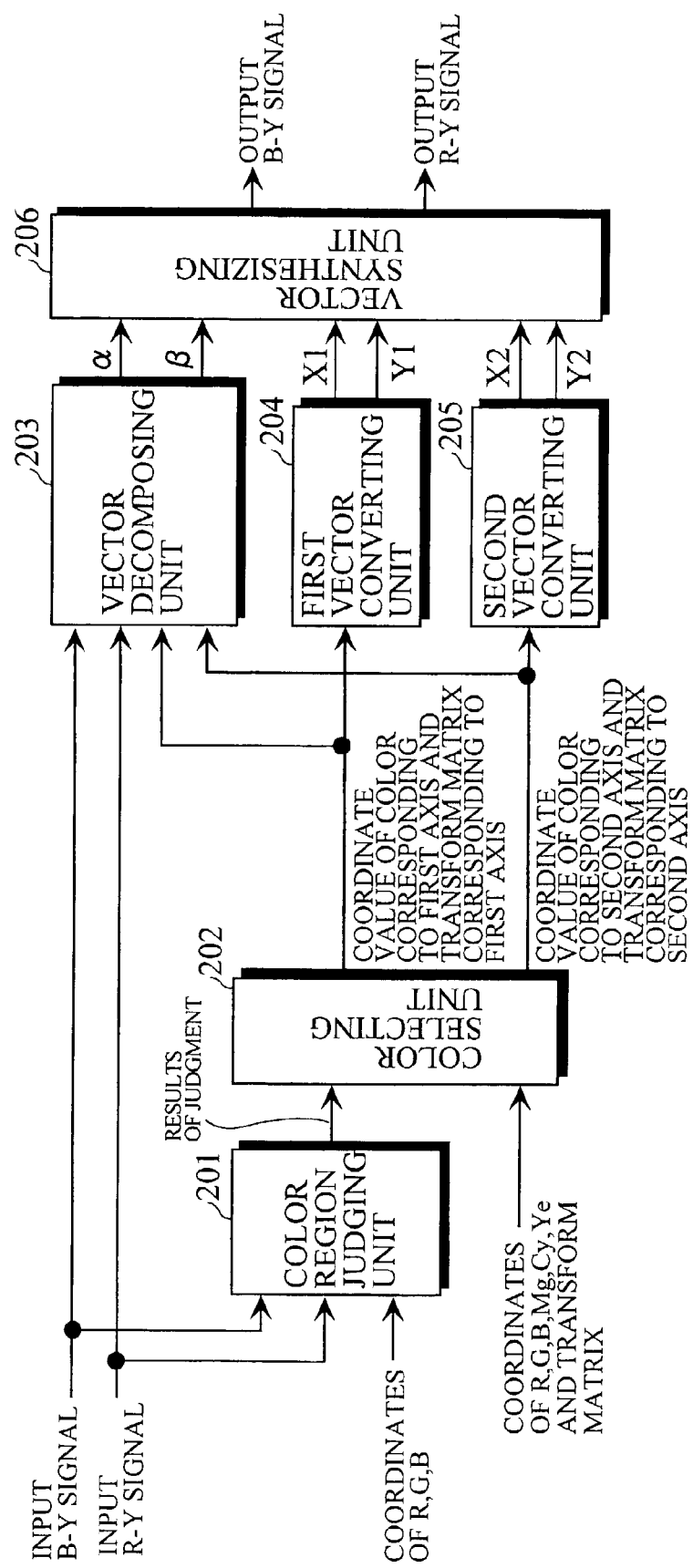
FIG. 11 is a block diagram showing the configuration of a color correcting circuit.

FIG. 11 illustrates the configuration of a color collecting circuit in a single plate type color camera.

The color correcting circuit is provided in the succeeding stage of the color difference matrix circuit 5 shown in FIG. 1. The color correcting circuit comprises a color region judging unit 201, a color selecting unit 202, a vector decomposing unit 203, a first vector converting unit 204, a second vector converting unit 205, and a vector synthesizing unit 206.

[2] Description of Color Region Judging Unit 201

Description is made of color region judgment processing by the color region judging unit 201.

Input color difference signals (B−Y) and (R−Y) are inputted to the color region judging unit 201, and coordinate values on a color difference signal plane of R, G, and B colors are inputted thereto.

Figure 12:
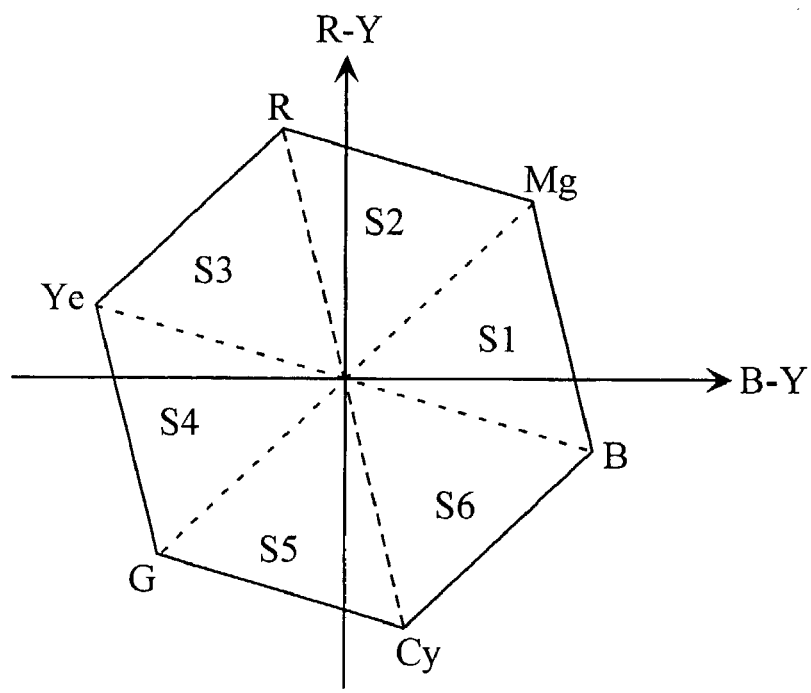
FIG. 12 is a schematic view showing a color difference signal plane where a color difference signal (B–Y) and a color difference signal (R–Y) are respectively used to enter the X-axis and the Y-axis.

FIG. 12 illustrates a color difference signal plane where the color difference signal (B−Y) and the color difference signal (R−Y) are respectively used to enter the X-axis and the Y-axis. Within the color difference signal plane, six triangular regions each formed by the origin and two adjacent ones of the vertexes Mg, R, Ye, G, Cy, and B of a hexagon are respectively taken as S1, S2, S3, S4, S5, and S6.

In other words, within the color difference signal plane, the range of a hue is divided into six regions S1 to S6 by three division axes, i.e., a Ye-B axis, a Cy-R axis, and an Mg-G axis.

The color region judging unit 201 judges for each pixel to which of the regions S1 to S6 the hue of the input color difference signal belongs on the basis of the color difference signals (R−Y) and (B−Y) inputted for each pixel. The judging method will be described.

Figure 13:
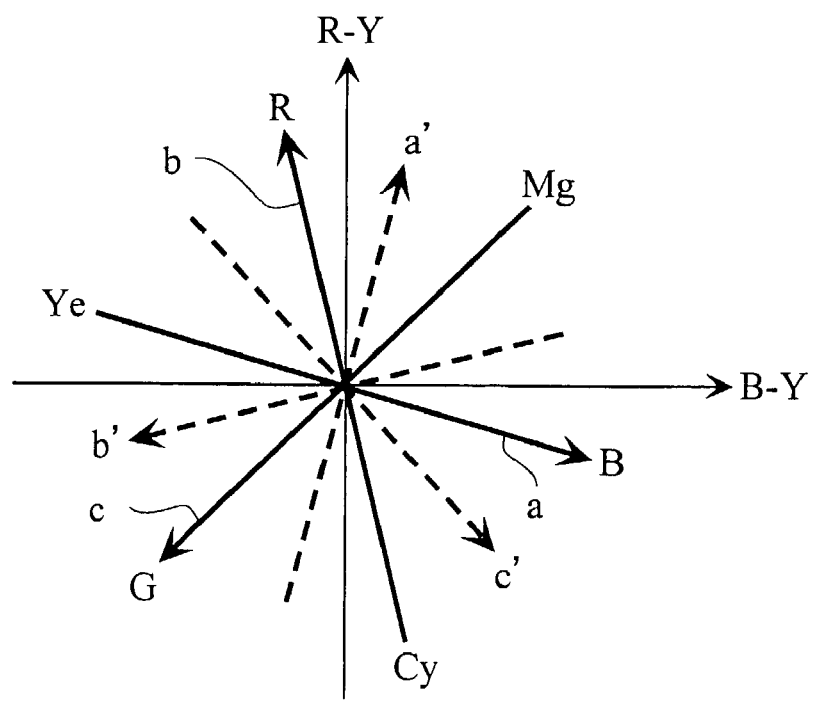
FIG. 13 is a schematic view showing position vectors a, b, and c for B, R, and G colors and vectors a', b', and c' perpendicular thereto.

Letting a, b, and c be respectively position vectors for B, R and G colors, as shown in FIG. 13, the vectors a, b, and c can be expressed by the following equation (2) using the coordinate values (ax, ay), (bx, by), and (cx, cy) of B, R, and G colors:

$$a=(ax,ay)$$
$$b=(bx,by)$$
$$c=(cx,cy) \quad (2)$$

Letting a', b', and c' be vectors obtained by rotating the vectors a, b, and c by 90 degrees in a counterclockwise direction, the vectors a', b', and c' are expressed by the following equation (3):

$$a'=(-ay,ax)$$
$$b'=(-by,bx)$$
$$c'=(-cy,cx) \quad (3)$$

Let p be a position vector of the input color difference signal. The respective inner products of the position vector p of the input color difference signal and the vectors a', b', and c' are operated on the basis of the following equation (4):

$$p \cdot a' = px \cdot (-ay) + py \cdot ax$$
$$p \cdot b' = px \cdot (-by) + py \cdot bx$$
$$p \cdot c' = px \cdot (-cy) + py \cdot cx \quad (4)$$

It is judged to which of the regions S1 to S6 the hue of the input color difference signal belongs on the basis of the respective signs of the inner products and a region judgment table shown in Table 1.

TABLE 1

|    | S1 | S2 | S3 | S4 | S5 | S6 | S7 | S8 |
|----|----|----|----|----|----|----|----|----|
| a' | +  | +  | +  | −  | −  | −  | +  | −  |
| b' | −  | −  | +  | +  | +  | −  | +  | −  |
| c' | +  | −  | −  | −  | +  | +  | +  | −  |

In Table 1, S7 indicates the origin. S8 indicates that there is no region. Further, in Table 1, + includes zero.

[3] Description of Color Selecting Unit 202

The results of the judgment by the color region judging unit 201 are inputted to the color selecting unit 202, and the coordinate values on the color difference signal plane of R, G, B, Mg, Cy, and Ye colors and a transform matrix for one, corresponding to a region where the color is changed, of the R, G, B, Mg, Cy, and Ye axes are inputted thereto. Here, description is made of a case where the color in a region S1 is changed. Consequently, transform matrices corresponding to the two axes B and Mg for defining the region S1 are inputted.

With respect to the input color difference signal whose hue is judged to be within the region S1, the color selecting unit 202 respectively selects and outputs the coordinate values of the colors B and Mg corresponding to the two axes (the first axis and the second axis) for defining the region S1 and the transform matrices corresponding to the axes.

The coordinate values of the colors B and Mg outputted from the color selecting unit 202 are sent to the vector decomposing unit 203. The coordinate value of the color B outputted from the color selecting unit 202 and the transform matrix corresponding to the B axis are sent to the first vector converting unit 204. The coordinate value of the color Mg outputted from the color selecting unit 202 and the transform matrix corresponding to the Mg axis are sent to the second vector converting unit 205.

[4] Description of Vector Decomposing Unit 203

Figure 14:
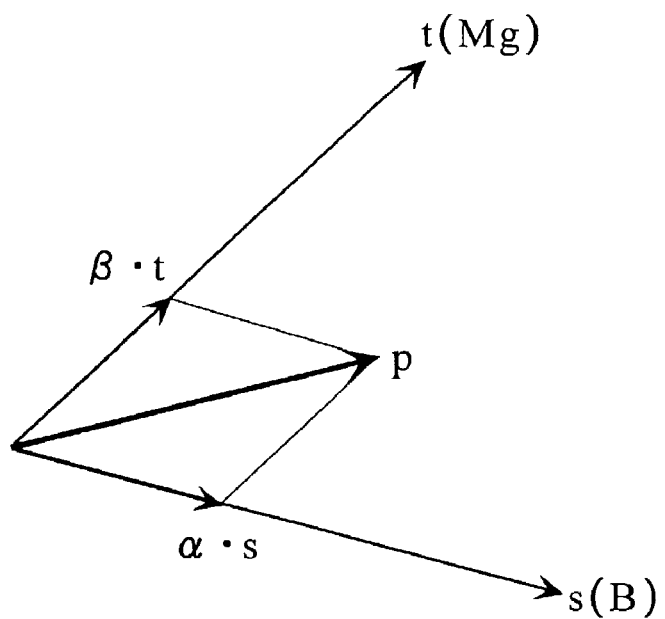
FIG. 14 is a schematic view showing how a position vector p of an input color difference signal is decomposed into vector components in directions corresponding to two axes adjacent to the position vector p.

It is assumed that the position vector p of the input color difference signal whose hue is judged to be within the region S1 is decomposed into vector components in directions (a and b directions) of the two axes (two axes adjacent to the position vector p) for designating the region S1. That is, it is assumed that the position vector p of the input color difference signal is decomposed into vector components corresponding to an axis in a direction of c and an axis in a direction a, as shown in FIG. 14. As the vectors corresponding to the two axes, vectors directed toward the six vertexes Mg, R, Ye, G, Cy, and B of the hexagon from the origin are used.

Letting t be the vector directed toward Mg from the origin (in the opposite direction to c), and letting s be the vector directed toward B from the origin (in the same direction as a), as shown in FIG. 14, p is expressed by the following equation (5):

$$p = \alpha \cdot s + \beta \cdot t \quad (5)$$

α and β are coefficients, where α, β ≧ 0.

Letting px, sx, tx be respectively x components of p, s, and t, and letting py, sy, and ty be respectively y components of p, s, and t, px (=an input color difference signal (B−Y)) and py (=an input color difference signal (R−Y)) are expressed by the following equation (6):

$$px = \alpha \cdot sx + \beta \cdot tx$$
$$py = \alpha \cdot sy + \beta \cdot ty \quad (6)$$

Consequently, the coefficients α and β are found by the following equation (7):

$$\alpha = (ty \cdot px - tx \cdot py)/(sx \cdot ty - sy \cdot tx)$$
$$\beta = (-sy \cdot px + sx \cdot py)/(sx \cdot ty - sy \cdot tx) \quad (7)$$

The vector decomposing unit 203 calculates sx, sy, tx, and ty from the coordinate values of the colors B and Mg sent from the color selecting unit 202. Further, the vector decomposing unit 203 calculates px and py from the input color difference signal. The coefficients α and β are found on the basis of the foregoing equation (7). The coefficients α and β found by the vector decomposing unit 203 are sent to the vector synthesizing unit 206.

[5] Description of First Vector Converting Unit 204 and Second Vector Converting Unit 205

Before describing the operations of each of the vector converting units 204 and 205, description is made of an idea for converting the color (the position vector p) of the input color difference signal will be described.

In order to convert the color (the position vector p) of the input color difference signal, the two axes s and t shown in FIG. 14 are first primarily converted by transform matrices S and T respectively expressed by the following equations (8) and (9):

$$S = \begin{vmatrix} S11 & S12 \\ S21 & S22 \end{vmatrix} \quad (8)$$

$$T = \begin{vmatrix} T11 & T12 \\ T21 & T22 \end{vmatrix} \quad (9)$$

The coefficients in the transform matrices S and T are previously set depending on the contents of the change in the hue in the region S1. Letting Ss and Tt be respectively s and t after the conversion, the color (the position vector p') after the change is expressed by the following equation (10):

$$p'=\alpha \cdot Ss+\beta \cdot Tt \quad (10)$$

Letting px' be the component of p' (the color difference signal (B−Y) after the change), and letting py' be the y component of p' (the color difference signal (R−Y) after the change), px' and py' are found by the following equation (11):

$$px'=\alpha \cdot (S11 \cdot sx+S12 \cdot sy)+\beta \cdot (T11 \cdot tx+T12 \cdot ty)$$

$$py'=\alpha \cdot (S21 \cdot sx+S22 \cdot sy)+\beta \cdot (T21 \cdot tx+T22 \cdot ty) \quad (11)$$

The first vector converting unit 204 calculates sx and sy on the basis of the coordinate value of the color B sent from the color selecting unit 202. (S11·sx+S12·sy)=X1 and (S21·sx+S22·sy)=Y1 in the foregoing equation (11) are calculated and outputted on the basis of sx and sy obtained and the transform matrix S corresponding to the B axis sent from the color selecting unit 202.

The second vector converting unit 205 calculates tx and ty on the basis of the coordinate value of the color Mg sent from the color selecting unit 202. (T11·tx+T12·ty)=X2 and (T21·tx+T22·ty)=Y2 in the foregoing equation (11) are calculated and outputted on the basis of tx and ty obtained and the transform matrix T corresponding to the Mg axis sent from the color selecting unit 202.

X1 and Y1 calculated by the first vector converting unit 204 and X2 and Y2 calculated by the second vector converting unit 205 are sent to the vector synthesizing unit 206.

[6] Description of Vector Synthesizing Unit 206

The vector synthesizing unit 206 calculates and outputs px' (the color difference signal (B−Y) after the change) and py' (the color difference signal (R−Y) after the change) on the basis of the coefficients α and β calculated by the vector decomposing unit 203, X1 and Y1 calculated by the first vector converting unit 204, and X2 and Y2 calculated by the second vector converting unit 205, and the foregoing equation (11).

Figure 15:
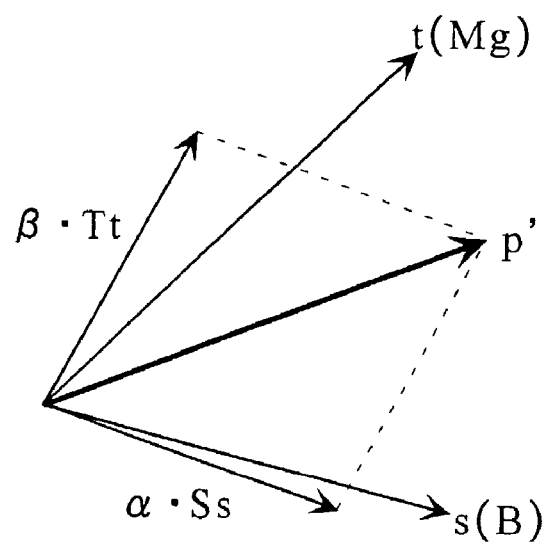
FIG. 15 is a schematic view showing a color (a position vector p') after conversion.

The color (the position vector p') after the conversion is as shown in FIG. 15, for example. In this example, the color in the region S1 is corrected toward the region S2. That is, the color in the region S1 can be changed by changing the coefficients in the transform matrices S and T. The color in the other region can be also similarly changed.

[C] Description of Third Embodiment

Figure 16:
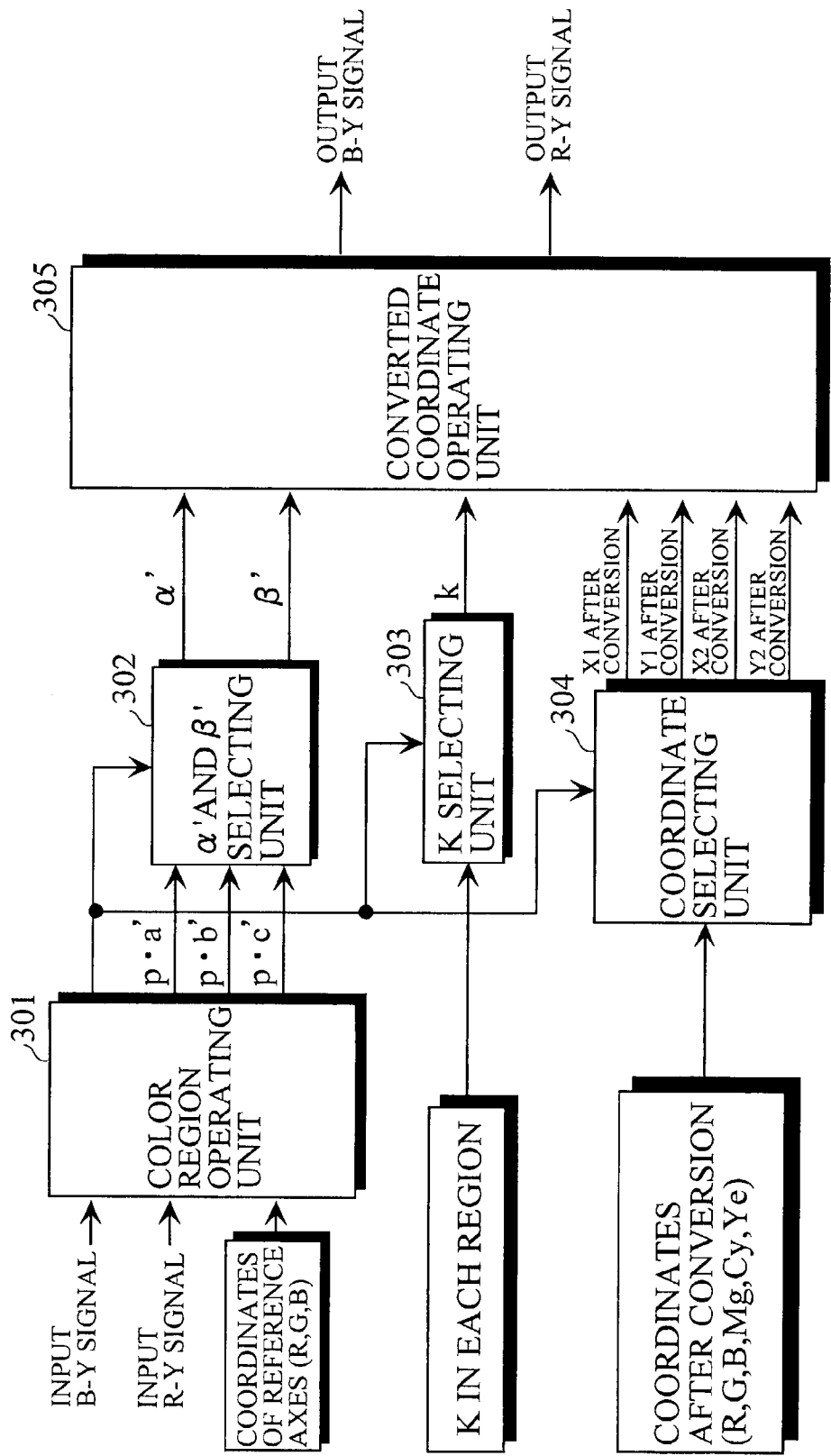
FIG. 16 is a block diagram showing another example of a color correcting circuit.

Referring to FIG. 16, a third embodiment of the present invention will be described.

[1] Description of Characteristics of Third Embodiment

First, description is made of the characteristics of a third embodiment, that is, the difference from the above-mentioned second embodiment. The third embodiment is characterized in two points.

[1-1] Description of First Feature Point

In the above-mentioned second embodiment, the color region judging unit 201 calculates the respective inner products of the position vector p of the input color difference signal and the vectors a', b', and c', and judges to which of the regions S1 to S6 the hue of the input color difference signal belongs by the respective signs of the inner products. In this case, the inner products are expressed by the following mathematical expression (12), as expressed by the foregoing equation (4):

$$p \cdot a'=px \cdot (-ay)+py \cdot ax$$

$$p \cdot b'=px \cdot (-by)+py \cdot bx$$

$$p \cdot c'=px \cdot (-cy)+py \cdot cx \quad (12)$$

Furthermore, in the above-mentioned second embodiment, the position vector p of the input color difference signal is decomposed into the vector components in the directions of the two axes (two axes adjacent to the position vector p) for defining the region including the vector p (S1 in the example shown in FIG. 14), as shown in FIG. 14.

In the case, letting s and t be respectively vectors corresponding to the two axes, the position vector p indicates p=α·s+β·t, as expressed by the foregoing equation (5). α and β are expressed by the following equation (13), as expressed by the foregoing equation (7):

$$\alpha=(ty \cdot px-tx \cdot py)/(sx \cdot ty-sy \cdot tx)$$

$$\beta=(-sy \cdot px+sx \cdot py)/(sx \cdot ty-sy \cdot tx) \quad (13)$$

As shown in FIG. 14, when the position vector p is in the region S1, sx=ax, sy=ay, tx=−cx, and ty=−cy. Accordingly, the numerator (α') of α and the numerator (β') of β in the foregoing equation (13) can be deformed, as expressed by the following equation (14):

$$\alpha'=\{px \cdot (-cy)-py \cdot (-cx)\}=p \cdot c'$$

$$\beta'=\{px \cdot (-ay)+py \cdot ax\}=p \cdot a' \quad (14)$$

Furthermore, the respective reciprocals K of the denominators of α and β in the foregoing equation (13) can be deformed, as expressed by the following equation (15):

$$K=1/\{ax \cdot (-cy)-ay \cdot (-cx)\} \quad (15)$$

The value of K is a constant determined for each of the regions S1 to S6.

In the third embodiment, the amount of operation processing of the numerators α' and β' of α and β is reduced by utilizing the inner product calculated in region judgment, and the amount of operation processing of the denominators of α and β is reduced by using K previously found for each of the regions.

[1-2] Description of Second Feature Point

In the above-mentioned second embodiment, when the position vector p shown in FIG. 14 is converted into a position vector p' shown in FIG. 15, vectors s and t corresponding to two axes with the position vector p interposed therebetween are primarily converted using the transform matrices S and T expressed by the equations (8) and (9).

In this case, the position vector p' after the conversion satisfies p'=α·Ss+β·Tt, as expressed by the foregoing equation (10). Further, x components px' and py' of the position vector p' after the conversion are expressed by the following equation (16), as expressed by the foregoing equation (11):

$$px' = \alpha \cdot (S11 \cdot sx + S12 \cdot sy) + \beta \cdot (T11 \cdot tx + T12 \cdot ty) \quad (16)$$
$$= \alpha \cdot X1 + \beta \cdot X2$$

$$py' = \alpha \cdot (S21 \cdot sx + S22 \cdot sy) + \beta \cdot (T21 \cdot tx + T22 \cdot ty)$$
$$= \alpha \cdot Y1 + \beta \cdot Y2$$

In the third embodiment, the coordinates (corresponding to Ss and Tt) after the conversion of the two axes s and t with the position vector p interposed therebetween are previously determined, thereby eliminating the necessity of a matrix operation for calculating X1, X2, Y1, and Y2.

That is, letting s' and t' be respectively the coordinates after the conversion of the two axes s and t with the position vector p interposed therebetween, s'x be the x component of s', s'y be the y component of s', t'x be the x component of t', and t'y be the y component of t', X1, X2, Y1, and Y2 are found by the following equation (17):

$$X1 = s'x$$
$$X2 = t'x$$
$$Y1 = s'y$$
$$Y2 = t'y \quad (17)$$

[2] Description of Configuration of Color Correcting Circuit in Single Plate Type Color Camera FIG. 16 illustrates the configuration of a color correcting circuit in a single plate type color camera.

The color correcting circuit comprises a color region operating unit 301, a α' and β' selecting unit 302 for producing α' and β', a K selecting unit 303 for producing K, a coordinate selecting unit 304 for producing X1, X2, Y1, and Y2, and a converted coordinate operating unit 305.

[3] Description of Color Region Operating Unit 201

The color region operating unit 301 calculates the respective inner products of a position vector p of an input color difference signal and vectors a', b', and c', and judges to which of regions S1 to S6 the hue of the input color difference signal belongs by the respective signs of the inner products, similarly to the color region judging unit 201 shown in FIG. 11.

The color region operating unit 301 outputs region information which is the results of the region judgment, and outputs the inner product values p·a', p·b', and p·c' of the position vector p used for the region judgment and the vectors a', b', and c'.

The region information outputted from the color region operating unit 301 is fed to the α' and β' selecting unit 302, the K selecting unit 303, and the coordinate selecting unit 304. The inner product values p·a', p·b', and p·c' outputted from the color region operating unit 301 are fed to the α' and β' selecting unit 302.

[4] Description of α' and β' Selecting Unit 302

The α' and β' selecting unit 302 outputs α' and β' on the basis of the region information inputted from the color region operating unit 301 and the inner product values p·a', p·b', and p·c'.

The relationship between the results of the region judgment represented by the region information and α' and β' outputted from the α' and β' selecting unit 302 is shown in Table 2:

TABLE 2

| region | α' | β' |
|---|---|---|
| S1 | α' = px · (−cy) − py · (−cx) = p · c' | β' = px · (−ay) + py · ax = p · a' |
| S2 | α' = px · by − py · bx = − p · b' | β' = px · cy + py · (−cx) = −p · c' |
| S3 | α' = px · (−ay) − py · (−ax) = p · a' | β' = px · (−by) + py · bx = p · b' |
| S4 | α' = px · cy − py · cx = −p · c' | β' = px · ay + py · (−ax) = −p · a' |
| S5 | α' = px · (−by) − py · (−bx) = p · b' | β' = px · (−cy) + py · cx = p · c' |
| S6 | α' = px · ay − py · ax = −p · a' | β' = px · by + py · (−bx) = −p · b' |
| S7 | α' = 0 | β' = 0 |
| S8 | α' = 0 | β' = 0 |

[5] Description of K Selecting Unit 303

The K selecting unit 303 selects, out of the values of K previously found for the regions S1 to S8, K corresponding to the region information inputted from the color region operating unit 301, and outputs the selected K.

The relationship between the results of the region judgment S1 to S8 represented by the region information and K outputted from the K selecting unit 303 is shown in Table 3.

TABLE 3

| region | K |
|---|---|
| S1 | $K = \dfrac{1}{ax \cdot (-cy) - ay \cdot (-cx)}$ |
| S2 | $K = \dfrac{1}{(-cx) \cdot by - (-cy) \cdot bx}$ |
| S3 | $K = \dfrac{1}{bx \cdot (-ay) - by \cdot (-ax)}$ |
| S4 | $K = \dfrac{1}{(-ax) \cdot cy - (-ay) \cdot cx}$ |
| S5 | $K = \dfrac{1}{cx \cdot (-by) - cy \cdot (-bx)}$ |
| S6 | $K = \dfrac{1}{(-bx) \cdot ay - (-by) \cdot ax}$ |
| S7 | K = 0 |
| S8 | K = 0 |

[6] Description of Coordinate Selecting Unit 304

Coordinates after conversion corresponding to R, G, B, Mg, Cy, and Ye axes taking the origin of a color difference signal plane as its base point are given to the coordinate selecting unit 304. The coordinate selecting unit 304 outputs X1, X2, Y1, and Y2 on the basis of the coordinates after conversion corresponding to the two axes for defining a region represented by the region information inputted from the color region operating unit 301.

[7] Description of Converted Coordinate Operating Unit 305

The converted coordinate operating unit 305 finds the color (the position vector p') after conversion on the basis of α' and β' sent from the α' and β' selecting unit 302, K sent from the K selecting unit 303, and X1, X2, Y1, and Y2 sent from the coordinate selecting unit 304.

That is, α and β are first found on the basis of the following equation (18):

$$\alpha = K\alpha'$$
$$\beta = K\beta' \quad (18)$$

px' (a color difference signal (B−Y) after change) and py' (a color difference signal (R−Y) after change) are calculated and outputted on the basis of the following equation (19):

$$px' = \alpha \cdot X1 + \beta \cdot X2$$

$$py' = \alpha \cdot Y1 + \beta \cdot Y2 \quad (19)$$

Although in the above-mentioned second or third embodiment, description was made of a case where the present invention is applied to the single plate type color camera, the present invention is also applicable to video display devices such as a television receiver, a VTR, and a liquid crystal projector.

According to the above-mentioned second or third embodiment, it is possible to correct, in all the hue ranges, a color only for the hue in the arbitrary range.

The invention claimed is:

1. A tone correcting circuit comprising:
   hue detecting means for detecting a hue component for each pixel from a first color difference signal R−Y and a second color difference signal B−Y; and
   gain controlling means for controlling for each pixel a gain for arbitrarily selected one of or an arbitrary combination of a luminance signal, a first color difference signal R−Y, and a second color difference signal B−Y depending on the detected hue component for each pixel, thereby correcting a tone only for an arbitrary hue, wherein
   the hue detecting means comprises a first bit shift circuit to which the first color difference signal (R−Y) is inputted, a second bit shift circuit to which a second color difference signal (B−Y) is inputted, and means for outputting for each pixel hue values corresponding to output values of both the bit shift circuits as hue components on the basis of a look-up table, and
   each of the bit shift circuits cutting the number of bits composing an n-bit input signal to m which is smaller than n, cutting, when at least the respective uppermost bits in the color difference signals are both zero, the upper x bits in each of the color difference signals, letting x be the smaller one of the number of bits, out of the bits from the uppermost bit to the (m+1)-th bit in one of the color difference signals, which are continuously zero from the uppermost bit and the number of bits, out of the bits from the uppermost bit to the (m+1)-th bit in the other color difference signal, which are continuously zero from the uppermost bit, and further cutting the lower (n−m−x) bits in each of the color difference signals when x is smaller than (n−m).

2. The tone correcting circuit according to claim 1, wherein a gain is set for each hue,
   the gain controlling means comprising
   gain calculating means for calculating for each pixel the gain corresponding to the hue component for each pixel detected by the hue detecting means on the basis of the set gain for each hue, and
   means for providing for each pixel the gain for the pixel calculated by the gain calculating means as the gain for arbitrarily selected one of or the arbitrary combination of the luminance signal, the first color difference signal R−Y, and the second color difference signal B−Y.

3. A hue correcting circuit comprising:
   hue detecting means for detecting a hue component for each pixel from a first color difference signal R−Y and a second color difference signal B−Y;
   first offset providing means for providing an offset for each pixel to the first color difference signal R−Y depending on the detected hue component for each pixel; and
   second offset providing means for providing an offset for each pixel to the second color difference signal B−Y, thereby correcting a hue only for an arbitrary hue, wherein
   the hue detecting means comprises a first bit shift circuit to which the first color difference signal (R−Y) is inputted, a second bit shift circuit to which a second color difference signal (B−Y) is inputted, and means for outputting for each pixel hue values corresponding to output values of both the bit shift circuits as hue components on the basis of a look-up table, and
   each of the bit shift circuits cutting the number of bits composing an n-bit input signal to m which is smaller than n, cutting, when at least the respective uppermost bits in the color difference signals are both zero, the upper x bits in each of the color difference signals, letting x be the smaller one of the number of bits, out of the bits from the uppermost bit to the (m+1)-th bit in one of the color difference signals, which are continuously zero from the uppermost bit and the number of bits, out of the bits from the uppermost bit to the (m+1)-th bit in the other color difference signal, which are continuously zero from the uppermost bit, and further cutting the lower (n−m−x) bits in each of the color difference signals when x is smaller than (n−m).

4. The hue correcting circuit according to claim 3, wherein an offset is set for each hue,
   each of the offset providing means comprising
   saturation detecting means for detecting saturation for each pixel from the first color difference signal R−Y and the second color difference signal B−Y,
   offset calculating means for calculating for each pixel an offset corresponding to the hue component for each pixel detected by the hue detecting means on the basis of the set offset for each hue,
   offset producing means for multiplying the offset for each pixel calculated by the offset calculating means by the saturation of the corresponding pixel detected by the saturation detecting means, to produce for each pixel the offset corresponding to the saturation, and
   means for providing for each pixel the offset for each pixel produced by the offset producing means to the color difference signal.

* * * * *